United States Patent [19]

Lindenbauer

[11] Patent Number: 4,566,434
[45] Date of Patent: Jan. 28, 1986

[54] SOLAR ENERGY COLLECTOR

[76] Inventor: Leo K. Lindenbauer, P.O. Box 1372, Wickenburg, Ariz. 85358

[21] Appl. No.: 685,557

[22] Filed: Dec. 24, 1984

[51] Int. Cl.$^4$ ............................................. F24J 2/08
[52] U.S. Cl. .................................. 126/440; 126/424; 126/417; 126/444
[58] Field of Search ............... 126/440, 451, 444, 417, 126/438, 424, 425

[56] References Cited

U.S. PATENT DOCUMENTS

| | | | |
|---|---|---|---|
| 496,959 | 5/1893 | Severy | 126/440 X |
| 895,761 | 8/1908 | Huntoon | 126/440 X |
| 1,658,455 | 2/1928 | Metzech et al. | 126/440 |
| 4,335,707 | 6/1982 | Lindenbauer | 126/440 |
| 4,341,204 | 7/1982 | Bloxson | 126/440 |

FOREIGN PATENT DOCUMENTS 2618189 11/1977 Fed. Rep. of Germany ...... 126/440

Primary Examiner—Larry Jones
Attorney, Agent, or Firm—Warren F. B. Lindsley

[57] ABSTRACT

An improved sun-tracking solar energy collector in constant focal communication with the rays of the sun during daylight hours in which the moving element comprises a lens which focuses the rays of the sun on an indentation of the collector which indentation has a liquid conducting passageway formfitting around it for absorbing the heat of the rays of the sun conducted to it by the lens.

4 Claims, 6 Drawing Figures

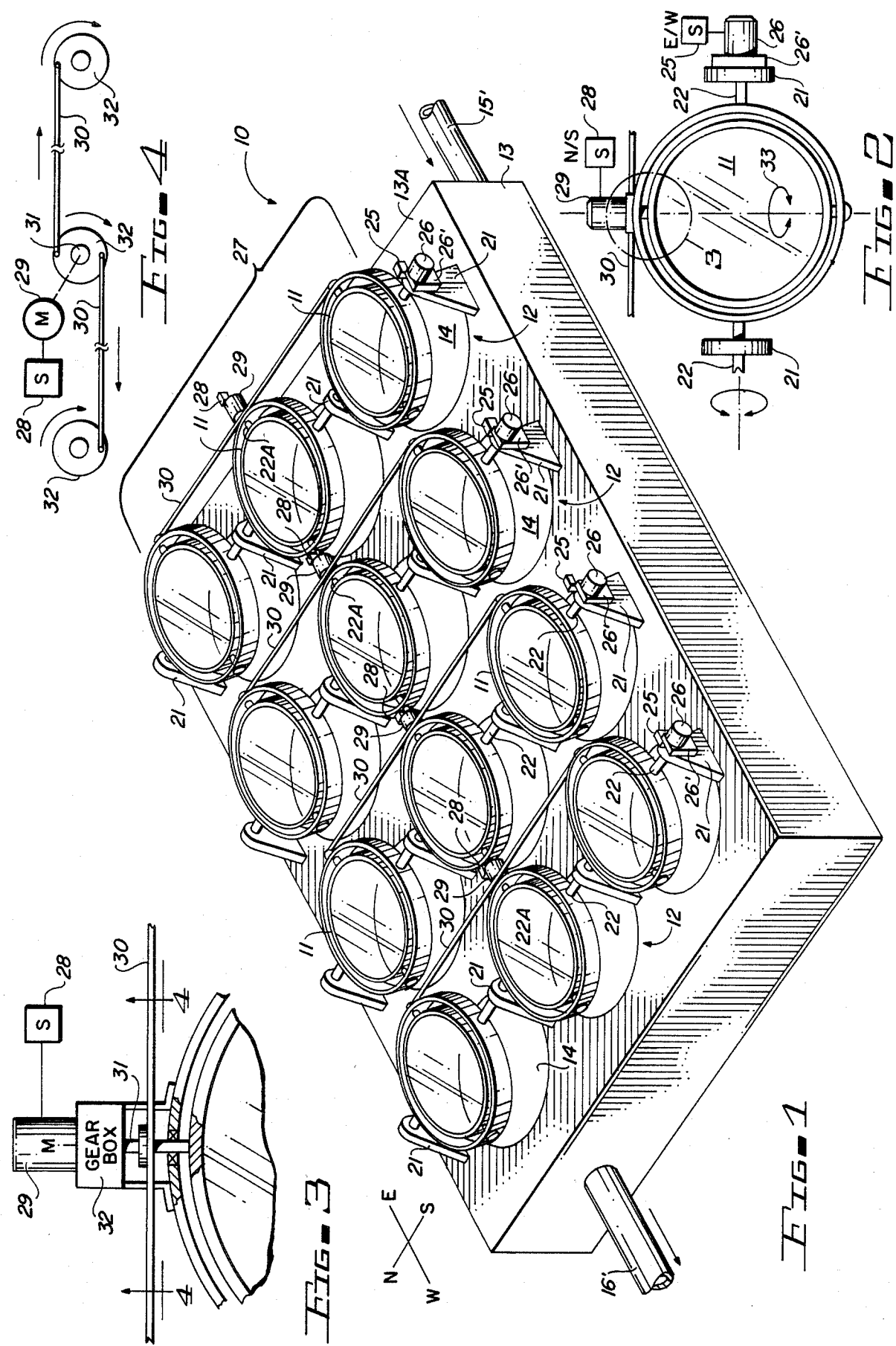

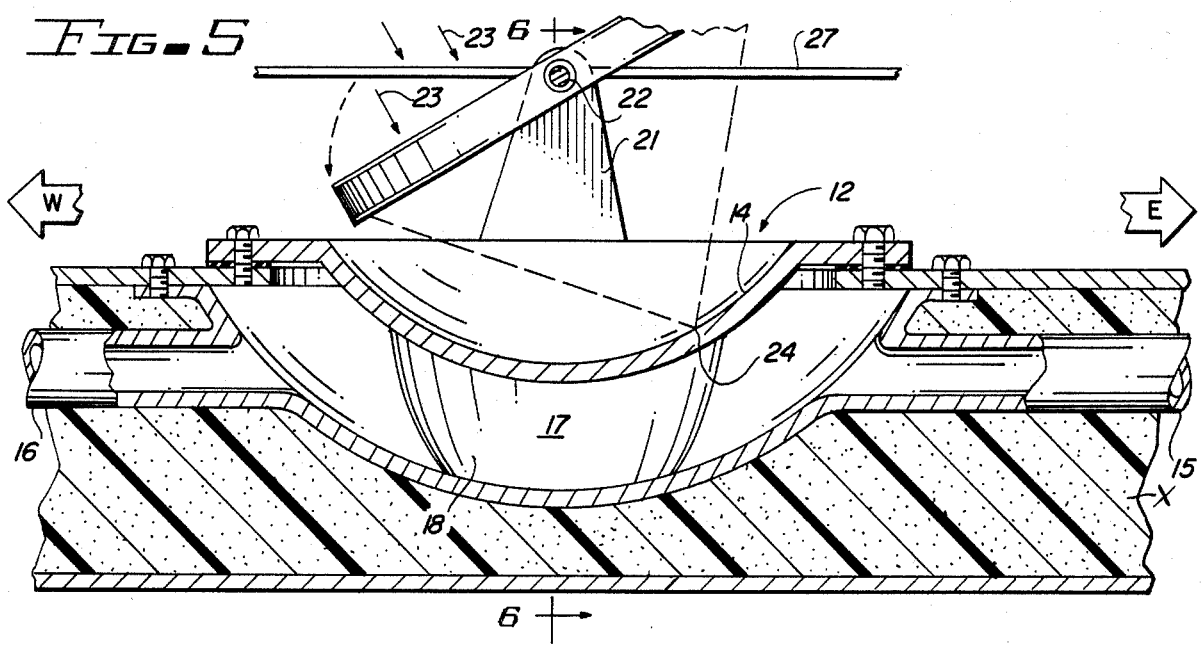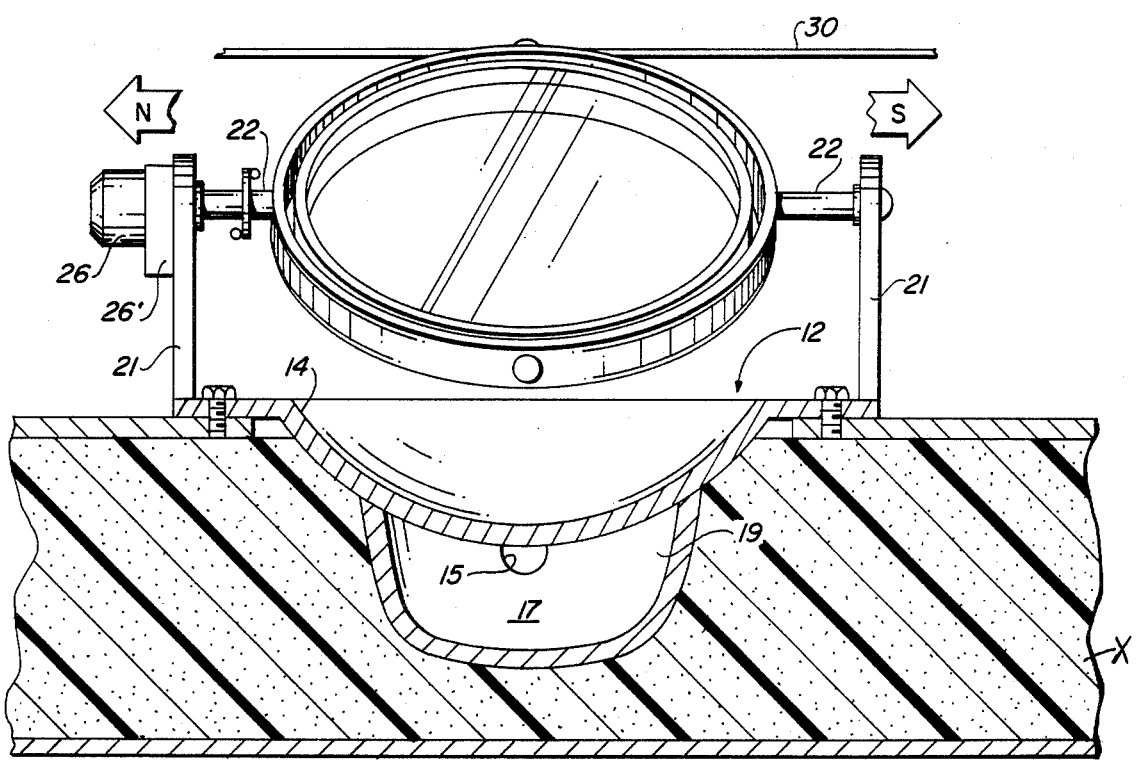

SOLAR ENERGY COLLECTOR

BACKGROUND OF THE INVENTION

The direct use of sunlight to supply the basic human needs for energy is of primary importance for human survival on earth, since the stored fuels, fossilized or organic, are being consumed at an incredible rate.

When an object is exposed to solar radiation, its temperature rises until its heat losses become equal to its heat gains. The losses depend on the emission of radiation by the heated material, the movement of the surrounding colder air and the thermal conductivity of the materials in contact with it. The gains depend on the intensity of solar radiation and the absorptivity of solar radiation by its surface.

Solar radiation can be collected in two general ways to produce high temperatures, namely by covering a receiving surface with a sunlight transparent sheet of glass or plastic and by focusing the solar radiation from a large surface onto a receiver of small area.

With focusing collectors, it is easier to obtain much higher temperatures than with flat plate collectors, but they usually cost more to build and operate.

DESCRIPTION OF THE PRIOR ART

U.S. Pat. No. 4,335,707 issued to applicant on June 22, 1982 is directed to a sun-tracking solar energy collector which is so designed that it may be in constant focal communication with the sun during daylight hours when the sun is shining. It is compact and inexpensive by virtue of the elimination of all energy storage elements from the moving mechanism.

In order to more effectively absorb and retain the solar energy received by the collector, it is desirable to provide a collector that employs a chamber or reservoir of a special contour immediately adjacent the depressions in the storage cell. This chamber utilized for transfer of fluids makes it possible for the collector to retain the energy absorbed to a higher degree than that possible with the structure disclosed in U.S. Pat. No. 4,335,707, and other structures of the prior art.

SUMMARY OF THE INVENTION

In accordance with the invention claimed, an improved sun-tracking solar concentrating energy collector is provided which is in constant focal communication with the sun's concentrated rays during daylight hours when the sun is shining and is designed to absorb a higher percentage of the solar radiation received than heretofore possible, and to minimize the losses due to radiation.

It is, therefore, one object of the present invention to provide an improved sun-tracking solar energy collector.

Another object of this invention is to provide a sun-tracking solar collector in which the bulk and weight of the moving element are reduced to a minimum.

A further object of this invention is to provide a sun-tracking solar collector in which the moving element has the sole function of capturing and redirecting the rays of the sun while a special chamber in the collector absorbs and effectively retains and/or distributes the solar heat collected.

A further object is to provide insulation around the energy collecting reservoir to prevent loss of energy.

A still further object of this invention is to provide a sun-tracking solar collector in a form requiring no flexible or rotating couplings for the transfer of a storage medium between the moving platform and associated stationary equipment.

A still further object of this invention is to provide a sun-tracking solar collector which is in constant communication with the sun's rays and by virtue of its basic cell configuration can be built up in any size array to fit the energy needs of the job to which it is to be applied.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWINGS

The present invention may be more readily described by reference to the accompanying drawing in which:

FIG. 1 is a perspective view of an improved sun-tracking solar collector array embodying the invention;

FIG. 2 is a top view of one of the cells shown in FIG. 1;

FIG. 3 is an enlarged view of the circled area shown in FIG. 2;

FIG. 4 is a cross-sectional view of FIG. 3 taken along the line 4—4;

FIG. 5 is a partial cross-sectional view of one of the cells shown in FIG. 1; and FIG. 6 is a cross-sectional view of FIG. 5 taken along the line 6—6.

DESCRIPTION OF THE PREFERRED EMBODIMENT

Referring more particularly to the drawings by characters of reference, FIG. 1 discloses an improved sun-tracking solar collector 10 comprising a plurality of sun-tracking lenses 11, each pivotally supported over a different associated energy storage cell 12. The collection of cells 12 shown in FIG. 1 defines a storage block 13.

Lens 11 is preferably a double convex lens which has the characteristic of receiving parallel rays of light and concentrating them at its focal point but may be any other form of lens structure and still fall within the scope of this invention.

The storage block 13 has the overall form of a cube or rectangle which is preferably fabricated to surround the collecting chambers providing a space for insulation around said chambers. Because it is desirable to mount the circular lens 11 in as close and equal proximity as possible to cells 12, an indentation or depression 14 is formed in or mounted in the top surface of block 13, one for each lens shown. These depressions preferably have a spherical contour that will provide clearance and equal focal distance for the associated lens 11 as it is tilted about its mounting axis. The indentations further provide a constant contact between the concentrated rays of the sun collected by the lens and the surface of the reservoir formed underneath the indentations.

Also incorporated in the cells are passageways for water or another medium for collecting heat from cells 12 and carrying the heat to an energy conversion system or to the point of use. The passageway for each cell comprises inlet and outlet pipes 15 and 16, as shown in FIG. 5, and an interconnecting reservoir 17. The reservoir is shaped to comprise an elongated portion 18 extending the full center portion of the base of the concave indentation or depression 14 when block 13 is placed in an east-west direction, as shown in FIG. 5, with a narrowing of the reservoir from the north-south direction comprising portions 19. The remaining space surrounding reservoir 17, as shown in FIG. 6 is filled with a heat retaining insulation X such as, for example, salt.

The reason for this form of passageway under the bottom surface of each indentation with the elongated larger portion extending east and west, and the smaller portion extending north and south, is the fact that the larger portion 18 is under the segment of the lens which receives the greatest concentration of solar energy each day of the year. Thus, it is desirable that the reservoir under this portion of the indentation is long and narrow, as shown, so that all of the energy received by the lens and transferred by the lens to the surface of the indentation may be absorbed and not dissipated or radiated to the atmosphere. This shape of reservoir places the greatest volume of liquid under the portion of the reservoir which receives the greatest intensity of solar radiation.

Each cell comprises the inlet and outlet pipes 15 and 16 that are arranged to pass unidirectionally the liquid through the cells with the outlet pipe of one cell connected in series or parallel with an inlet pipe of another, and so forth. Inlet and outlet pipes 15' and 16' connect the associated inlet and outlet pipes of block 13 to a liquid heat exchange system.

Lens mounting supports 21 are provided for the pivotal mounting of lenses 11 and are located at opposite sides of each of the depressions 14 rising vertically from the top surface of the various cells 12. Pivot pins 22 extending outwardly along a common diameter of the associated lens 11 pass through horizontally aligned holes in supports 21. The lens may be rotated about this pivotal support to be directed toward the sun and to follow the sun as it moves across the sky in an east-west direction.

As shown in FIG. 5, when lens 11 is directed toward the sun, the sun's rays 23 are received as parallel rays aligned with the optical axis of the lens. The parallel rays pass through lens 11 and converge on the opposite side thereof as its focal point 24 which preferably lies on the surface of the spherical depression 14.

The surface of depression 14, as well as all other surfaces of block 15 that are exposed to the sun, may be painted block to enhance their capability for absorbing the impinging rays of the sun. When the position of the sun is directly above block 13, a maximum amount of energy is collected at surface 13A; at other times as in the early morning or later afternoon, the collected energy is limited for the most part to that collected by lens 11 which is instrumental in directing rays 23 of the sun to the surface of the depression 14.

The collected solar energy received by the surface 13A is carried by the thermally conductive metal of block 13 to the water or other medium passing through or contained within pipes 15 and 16 and chambers or reservoirs 17.

As shown in FIG. 1, the individual cells 12 are arranged together in a block 13 to form an array in which the inlet pipe 14 and the outlet pipe 15 are common to all of the cells 12 shown. The water or other medium used thus passes serially or parallel through the connected cells, collecting thermal energy from each cell.

A common sun sensor 25, drive motor 26 and gear box 26', shown in FIGS. 1, 2 and 6, are connected together and employed to actuate in unison in an east-west direction each group 27 of lenses 11. As shown in FIG. 1, there are four groups of three lenses, each mounted on block 13, although any number of groups of any group size may be used and fall within the scope of this invention.

The shaft of motor 26 is connected to pivot pin 22 for rotating it and the other pivot pins 22 of the lenses 11 in a particular group 27. As noted from FIG. 1, each group 27 of lenses has its own sun sensor 25 and motor 26 for actuating the movement of the lenses to follow the sun.

In order to cause each group 27 of lenses to move in a north-south direction to follow the sun, a second sun sensor and motor combination is used for each group 27 of lenses. As shown in FIGS. 2 and 3, a sun sensor 28 and motor 29 are employed to actuate a rail 30 which is coupled to an extended pivot pin 31 through a gear mechanism or box 32. The coupling of pivot pin 31 to rail 30 causes rail 30 to rotate the lenses about pivot pin 31 seasonally as indicated by the arrows 33 in FIG. 2.

It will be recognized that an improved sun-tracking solar collector has been provided which through its lens system is in constant focal communication with the sun's rays as the sun moves across the sky during the course of the day in accordance with the stated objects of the invention. The only moving element of the collector is lens 11 which receives and redirects the rays of the sun to the storage cell 12. A highly compact and inexpensive tracking system is thus provided that requires no flexible or rotating fluid couplings. Further, the claimed cell configuration can be built up to any size array to fit given energy requirements by a predetermined combination of the cell disclosed.

With the claimed reservoir configuration substantially all of the solar energy received is absorbed by the liquid flowing therethrough; thus, greatly reducing the opportunity for loss of heat from block 13 through radiation.

Although but a single embodiment of the invention has been illustrated and described, it will be apparent to those skilled in the art that various changes and modifications may be made therein without departing from the spirit of the invention or from the scope of the appended claims.

What is claimed is:

1. A solar energy collector comprising:
   a block of heat absorbing material,
   at least one lens pivotally mounted on a surface of said block for receiving the rays of the sun,
   an indentation comprising a spherical configuration formed in said surface of said block juxtapositioned to said lens,
   said indentation providing clearance for the lens as it is pivoted about its mounting axis,
   a fluid conducting passageway traversing said block and comprising an expanded portion formfitting around at least a portion of the base of said indentation,
   said expanded portion comprising an elongated first segment extending in an east-west direction when said block is exposed to the sun and encompassing a greater volume than a second smaller segment extending in a north-south direction substantially perpendicular to said first segment, said first segment receiving a greater concentration of solar energy each day of the year than said second segment, thereby causing the fluid passing through said passageway to more effectively absorb the heat of the walls of said indentation, said passageway comprising inlet and outlet pipes extending into and out of said first segment, and sun tracking means for pivotally rotating said lens to follow the sun.

2. The solar energy collector set forth in claim 1 in further combination with:

a second lens pivotally mounted on a surface of said block for receiving the rays of the sun, a second indentation in the surface of said block juxtapositioned to said second lens, said second indentation providing clearance for said second lens as it is pivoted about its mounting axis, a second fluid conducting passageway traversing beneath and formfitting around at least a portion of said second indentation, and means for connecting in series the passageways of the first and second lens to form an array.

3. The solar energy collector set forth in claim 2 in further combination with:

means for connecting both lens together, and said sun-tracking means being connected to said means for causing the lenses to follow in unison the movement of the sun.

4. The solar energy collector set forth in claim 1 in further combination with:

a plurality of lenses, one for each indentation in said block, each of said plurality of lenses being pivotally mounted on a surface of the associated block for receiving the rays of the sun, a plurality of indentations formed in the surface of said block, one juxtapositioned to each of the lenses, said indentations provide clearances for said plurality of lenses as they pivot about their mounting axes, a plurality of additional passageways traversing beneath and formfitting around at least a portion of each of said indentations, means for connecting the passageway beneath each of said indentations in series, means for connecting said lens and lenses together, and said sun-tracking means being connected to said means for causing the lens associated with each indentation to follow in unison the movement of the sun.

* * * * *